US011340063B2

(12) United States Patent
Chen et al.

(10) Patent No.: US 11,340,063 B2
(45) Date of Patent: May 24, 2022

(54) INFRARED-BASED ROAD SURFACE MONITORING SYSTEM AND METHOD, AND AUTOMOBILE

(71) Applicant: Hasco Vision Technology Co., Ltd., Shanghai (CN)

(72) Inventors: Zhaoyu Chen, Shanghai (CN); Xie Dai, Shanghai (CN)

(73) Assignee: Hasco Vision Technology Co., Ltd., Shanghai (CN)

( * ) Notice: Subject to any disclaimer, the term of this patent is extended or adjusted under 35 U.S.C. 154(b) by 283 days.

(21) Appl. No.: 16/496,846

(22) PCT Filed: Mar. 27, 2019

(86) PCT No.: PCT/CN2019/079925
§ 371 (c)(1),
(2) Date: Sep. 23, 2019

(87) PCT Pub. No.: WO2020/181583
PCT Pub. Date: Sep. 17, 2020

(65) Prior Publication Data
US 2021/0333098 A1     Oct. 28, 2021

(30) Foreign Application Priority Data

Mar. 14, 2019   (CN) .......................... 201910195534.7

(51) Int. Cl.
*H04N 7/00*     (2011.01)
*G01B 11/30*   (2006.01)
(Continued)

(52) U.S. Cl.
CPC ............ *G01B 11/303* (2013.01); *G06V 20/58* (2022.01); *H04N 5/33* (2013.01); *H04N 7/18* (2013.01)

(58) Field of Classification Search
CPC .............. G01B 11/303; G01B 11/2513; G06K 9/00805; H04N 5/33; H04N 7/18; G01V 8/12
See application file for complete search history.

(56) References Cited

U.S. PATENT DOCUMENTS 5,040,116 A * 8/1991 Evans, Jr. ............. G01S 17/931
                                                        701/28
5,631,735 A     5/1997 Nagai
(Continued)

FOREIGN PATENT DOCUMENTS

CN    106052870 A    10/2016
CN    106809217 A    6/2017
(Continued)

OTHER PUBLICATIONS

Fofi et al. "A comparative survey on invisible structured light," Proc. SPIE 5303, Machine Vision Applications in Industrial Inspection XII, (May 3, 2004); doi: 10.1117/12.525369 (Year: 2004).*
(Continued)

*Primary Examiner* — Frank F Huang
(74) *Attorney, Agent, or Firm* — Wood Herron & Evans LLP

(57) ABSTRACT

The present disclosure discloses an infrared-based road surface monitoring system and method, and an automobile, and relate to the technical field of automated driving of automobile. The infrared-based road surface monitoring system includes: an infrared spotlight assembly, a camera, and an image processor connected with the camera, wherein the infrared spotlight assembly is configured to emit alternate bright and dark infrared stripes, the camera is configured to capture a mode of real-time infrared stripes on a road surface, and the image processor is configured to calculate the form of the stripes on the road surface captured by the camera, so as to obtain road surface or obstacle information (Continued)

and calculate a condition of the road surface, which are fed back to an automatic driving system of an automobile in real time, finally achieving purpose of monitoring road surface and automatic driving.

16 Claims, 2 Drawing Sheets

(51) Int. Cl.
*H04N 5/33* (2006.01)
*H04N 7/18* (2006.01)
*G06V 20/58* (2022.01)

(56) References Cited

U.S. PATENT DOCUMENTS

| | | | | |
|---|---|---|---|---|
| 6,303,254 | B1* | 10/2001 | Yu | G03G 5/10 430/56 |
| 10,276,075 | B1* | 4/2019 | Ben-Lavi | G09G 3/001 |
| 2003/0221764 | A1* | 12/2003 | Yu | B29C 65/1612 156/73.4 |
| 2003/0221785 | A1* | 12/2003 | Yu | B29C 66/723 156/380.9 |
| 2003/0222078 | A1* | 12/2003 | Yu | B29C 66/81423 219/619 |
| 2003/0224161 | A1* | 12/2003 | Yu | B29C 66/8227 428/344 |
| 2005/0000543 | A1* | 1/2005 | Taylor | G05D 1/0219 134/18 |
| 2006/0091297 | A1* | 5/2006 | Anderson | G01S 17/87 250/221 |
| 2012/0218464 | A1* | 8/2012 | Ben-Moshe | G02B 26/0833 348/369 |
| 2015/0206016 | A1* | 7/2015 | Chiu | G06K 9/00812 348/36 |
| 2017/0300061 | A1* | 10/2017 | Hickerson | G05D 1/0246 |
| 2018/0276844 | A1* | 9/2018 | Takahashi | G06T 7/536 |
| 2019/0145891 | A1* | 5/2019 | Waxman | G01J 3/0208 356/409 |
| 2019/0342510 | A1* | 11/2019 | Sano | H01L 27/14643 |
| 2021/0072020 | A1* | 3/2021 | Thony | B60Q 9/008 |
| 2021/0333098 | A1* | 10/2021 | Chen | G01B 11/303 |
| 2021/0339674 | A1* | 11/2021 | Chen | F21S 41/25 |

FOREIGN PATENT DOCUMENTS

| | | |
|---|---|---|
| CN | 107628032 A | 1/2018 |
| CN | 108020516 A | 5/2018 |
| CN | 209460422 U | 10/2019 |
| JP | H07322367 A | 12/1995 |
| JP | 2004328240 A | 11/2004 |
| JP | 2008108613 A | 5/2008 |
| JP | 2008217267 A | 9/2008 |
| JP | 2011249184 A | 12/2011 |
| JP | 2012183863 A | 9/2012 |
| JP | 2018508074 A | 3/2018 |
| WO | 2016/138145 A1 | 9/2016 |

OTHER PUBLICATIONS

Matthies et al. "Fast Optical Hazard Detection for Planetary Rovers using Multiple Spot Laser Triangulation", Proceedings of the 1997 IEEE International Conference on Robotics and Automation Albuquerque, New Mexico—Apr. 1997 (Year: 1997).*

Zhang Jing, International Search Report and Written Opinion of PCT/CN2019/079925 with an international filing date of Mar. 27, 2019, dated Dec. 3, 2019, 15 pgs. with translation, China National Intellectual Property Administration (ISA/CN), Beijing, China.

Fukuda, Yuji, Office Action of Japanese Patent Application No. JP 2019-535908 with a filing date of Mar. 27, 2019, dated Jun. 23, 2021, 8 pgs. with English translation, Japanese Patent Office, Tokyo, Japan.

* cited by examiner

INFRARED-BASED ROAD SURFACE MONITORING SYSTEM AND METHOD, AND AUTOMOBILE

CROSS-REFERENCE TO RELATED APPLICATION

The present disclosure claims the priority to the Chinese Patent Application with the filing number 2019101955347 filed with the Chinese Patent Office on Mar. 14, 2019, entitled "Infrared-based Road Surface Monitoring System and Method, and Automobile", the contents of which are incorporated in the present disclosure by reference in its entirety.

TECHNICAL FIELD

The present disclosure relates to the technical field of automated driving of automobile, particularly to an infrared-based road surface monitoring system and method, and an automobile.

BACKGROUND ART

Currently, multiple vehicle-mounted sensors are utilized in automatic driving to sense environments around a vehicle, control steering and speed of the vehicle, and dynamically plan a route, to achieve automatic traveling of vehicle. The development of automatic driving technique primarily includes three systems: a positioning navigation system (vehicle positioning technique), an environment sensing system (visual/non-visual recognition technique), and a plan control system (route plan, speed, direction, and assistance control technique).

For the environment sensing system of automatic driving, an automobile needs a set of road surface detection system based on the visual or non-visual recognition technique, but at present, existing devices capable of achieving road surface real-time monitoring in an automatic driving process are relatively complex in structure and relatively high in cost.

SUMMARY

An object of the present disclosure includes, for example, providing an infrared-based road surface monitoring system and method, and an automobile, so as to solve the technical problems that existing road surface real-time monitoring manners are complex in structure, ineffective, and relatively high in cost.

Embodiments of the present disclosure may be realized as follows:

An embodiment of the present disclosure provides an infrared-based road surface monitoring system, including: an infrared spotlight assembly, a camera, and an image processor connected with the camera; wherein the infrared spotlight assembly is configured to emit alternate bright and dark infrared stripes, the camera is configured to capture a mode of real-time infrared stripes on a road surface, and the image processor is configured to calculate the form of the stripes on the road surface captured by the camera, so as to obtain road surface or obstacle information and calculate a condition of the road surface, which are fed back to an automatic driving system of an automobile in real time, finally achieving purpose of monitoring road surface and automatic driving.

Optionally, the infrared spotlight assembly includes: a lens, a blocking structure, a reflecting mirror, and an infrared light source; the infrared light source and the blocking structure are respectively mounted at two ends of the reflecting mirror, and the lens is mounted at one side of the blocking structure and provided as being away from the infrared light source; the infrared light source is configured to emit infrared rays, which is reflected by the reflecting mirror, and the infrared rays pass through the blocking structure to form a light pattern with alternate bright and dark stripes, and the infrared rays are transmitted through the lens onto a front road surface to form a light pattern with zebra stripes.

Optionally, the infrared spotlight assembly includes: a lens, a blocking structure, and an infrared light source; the lens and the infrared light source are respectively mounted at two sides of the blocking structure; and the infrared light source is configured to emit infrared rays, and the infrared rays pass through the blocking structure to form the light pattern with alternate bright and dark stripes, and the infrared rays are transmitted through the lens onto the front road surface to form the light pattern with zebra stripes.

Optionally, the blocking structure is provided to be located at a focal plane of the lens.

Optionally, the infrared spotlight assembly further includes a lens holder, and the lens is mounted on the lens holder.

Optionally, the infrared spotlight assembly further includes a heat sink, and the heat sink is mounted on a back face of the infrared light source.

Optionally, the blocking structure is a grating.

Optionally, the blocking structure has several parallel strip-shaped light-transmission holes thereon and is located at a projection exit of the infrared rays.

Optionally, the blocking structure comprises a frame and several blocking sheets provided on the frame, the several blocking sheets are provided in parallel so as to constitute the strip-shaped light-transmission holes through gaps between adjacent blocking sheets.

Optionally, the blocking structure is a light guiding plate transmitting light at intervals using refraction of the lens.

Optionally, two infrared spotlight assemblies are comprised, and configured to be respectively arranged on vehicle lamps at two sides of the automobile.

Optionally, infrared rays from the vehicle lamp at one side are converted by the blocking structure into horizontal stripes, infrared rays from the vehicle lamp at the other side are converted by the blocking structure into vertical stripes, and a picture is taken by the camera; alternatively, the infrared rays from the vehicle lamps at two sides are configured to start to simultaneously present the horizontal stripes and the vertical stripes, and a picture is taken by the camera; alternatively, the infrared rays from the vehicle lamps at two sides are configured to start to present the horizontal stripes and the vertical stripes intermittently at a certain frequency, and a picture is taken by the camera.

Optionally, the infrared spotlight assembly is configured to be arranged on the vehicle lamp at one side of the automobile, and infrared rays are converted by the blocking structure into horizontal stripes or vertical stripes; the camera is arranged on the other side of the automobile, and configured to capture the light pattern with the horizontal stripes or the vertical stripes irradiated onto the road surface.

Compared with the prior art, the infrared-based road surface monitoring system provided in the embodiment of the present disclosure at least has following advantages:

The infrared-based road surface monitoring system provided in the embodiment of the present disclosure includes: the infrared spotlight assembly, the camera, and the image processor connected with the camera; the infrared spotlight assembly is configured to emit alternate bright and dark infrared stripes, the camera is configured to capture the mode of real-time infrared stripes on the road surface, the image processor is configured to calculate the form of the stripes on the road surface captured by the camera, so as to obtain the road surface or obstacle information and calculate the condition of the road surface, which are fed back to the automatic driving system of the automobile in real time, finally achieving purpose of monitoring road surface and automatic driving. It can be seen from the analysis that in the infrared-based road surface monitoring system provided in the embodiment of the present disclosure, the infrared spotlight assembly emits alternate bright and dark horizontal or vertical infrared stripes. When the stripes are irradiated onto a surface of an object, the irradiated object diffusely reflects infrared rays, and the infrared stripes are also regulated as a contour of the object changes, such that the shape of the stripes is distorted and deformed, and the mode of real-time infrared stripes on the road surface is captured with the camera. The image processor calculates the form of the stripes on the road surface captured by the camera, then information on the road surface (undulations and potholes on the road surface, and a distance to an obstacle, and position, shape, size, and height of the obstacle and so on) can be obtained, and the road surface condition calculated by the image processor is fed back to the automatic driving system of a vehicle body in real time, thus finally achieving the purpose of monitoring road surface and automatic driving. To sum up, the infrared-based road surface monitoring system provided in the embodiment of the present disclosure can solve the problem of road surface monitoring in a vehicle traveling process with a simple structure at a relatively low cost, and meanwhile solve the technical problems that existing road surface real-time monitoring manners are complex in structure, ineffective, and relatively high in cost.

An embodiment of the present disclosure further provides an infrared-based road surface monitoring method, including following steps: emitting, by an infrared spotlight assembly, alternate bright and dark infrared stripes; capturing, by a camera, a mode of real-time infrared stripes on a road surface; and calculating, by an image processor, the mode of stripes on the road surface captured by the camera, so as to obtain road surface or obstacle information and calculate a condition of the road surface, which are fed back to an automatic driving system of an automobile in real time.

Compared with the prior art, the infrared-based road surface monitoring method provided in the embodiment of the present disclosure at least has following advantages:

The infrared-based road surface monitoring method provided in the embodiment of the present disclosure includes following steps: emitting, by the infrared spotlight assembly, alternate bright and dark infrared stripes; capturing, by the camera, the mode of real-time infrared stripes on the road surface; and calculating, by the image processor, the mode of stripes on the road surface captured by the camera, so as to obtain road surface or obstacle information and calculate the condition of the road surface, which are fed back to the automatic driving system of the automobile in real time. It can be seen from the analysis that in the infrared-based road surface monitoring method provided in the embodiment of the present disclosure, the infrared spotlight assembly emits alternate bright and dark horizontal or vertical infrared stripes. When the stripes are irradiated onto a surface of an object, the irradiated object diffusely reflects infrared rays, and the infrared stripes are also regulated as a contour of the object changes, such that the shape of the stripes is distorted and deformed, and the mode of real-time infrared stripes on the road surface is captured with the camera. The image processor calculates the form of the stripes on the road surface captured by the camera, then information on the road surface (undulations and potholes on the road surface, and a distance to an obstacle, and position, shape, size, and height of the obstacle and so on) can be obtained, and the road surface condition calculated by the image processor is fed back to the automatic driving system of a vehicle body in real time, thus finally achieving the purpose of monitoring road surface and automatic driving. To sum up, the infrared-based road surface monitoring method provided in the embodiment of the present disclosure can solve the problem of road surface monitoring in a vehicle traveling process at a relatively low cost, and meanwhile solve the technical problems that existing road surface real-time monitoring manners are ineffective and relatively high in cost.

An embodiment of the present disclosure further provides an automobile, including the above infrared-based road surface monitoring system; or using the above infrared-based road surface monitoring method.

Advantages of this automobile are the same as those of the above infrared-based road surface monitoring system and method with respect to the prior art, and are not repeated redundantly herein.

BRIEF DESCRIPTION OF DRAWINGS

In order to more clearly illustrate technical solutions of embodiments of the present disclosure, accompanying drawings which need to be used in the embodiments will be introduced briefly below. It should be understood that the accompanying drawings below merely show some embodiments of the present disclosure, and therefore should not be considered as limitation on the scope. A person ordinarily skilled in the art still can obtain other relevant accompanying drawings according to these accompanying drawings, without inventive effort.

Figure 1:
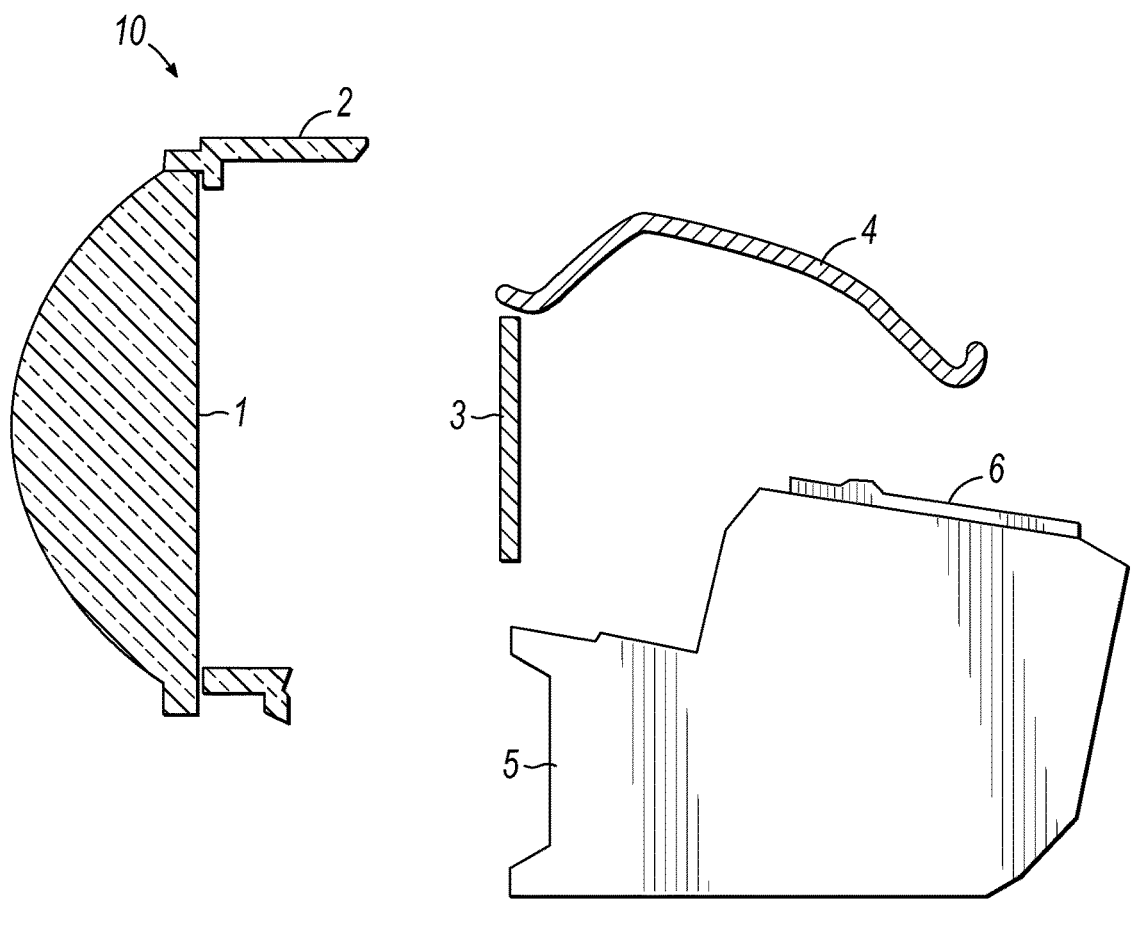
FIG. 1 is a structural schematic diagram of an infrared spotlight assembly in an infrared-based road surface monitoring system provided in an embodiment of the present disclosure.

In the figures: 1—lens; 2—lens holder; 3—blocking structure; 31—frame; 32—blocking sheet; 33—strip-shaped light-transmission hole; 4—reflecting mirror; 5—heat sink; 6—infrared light source; 10—infrared spotlight assembly; 11—camera; 12—image processor; 13—automatic driving system; 14—road surface condition.

DETAILED DESCRIPTION OF EMBODIMENTS

In order to make objects, technical solutions, and advantages of the embodiments of the present disclosure clearer, below the technical solutions in the embodiments of the present disclosure will be described clearly and completely in conjunction with the accompanying drawings in the embodiments of the present disclosure, apparently, the embodiments to be described are some but not all embodiments of the present disclosure. Generally, components in the embodiments of the present disclosure described and shown in the accompanying drawings herein can be arranged and designed in various different configurations.

Therefore, the detailed description below of the embodiments of the present disclosure provided in the accompanying drawings is not intended to limit the claimed scope of the present disclosure, but merely represents chosen embodiments of the present disclosure. All other embodiments obtained by a person ordinarily skilled in the art, based on the embodiments of the present disclosure without inventive effort, shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientational or positional relationships indicated by terms such as "center", "upper", "lower", "left", "right", "vertical", "horizontal", "inner", and "outer", if appear, are orientational or positional relationships as shown based on the accompanying drawings, or orientational or positional relationships of an inventive product when being conventionally placed in use, merely for facilitating describing the present disclosure and simplifying the description, rather than indicating or suggesting that referred devices or elements have to be in the specific orientation or configured and operated in a specific orientation, therefore, they should not be construed as limitation on the present disclosure.

Besides, terms such as "first", "second", and "third", if appear, are merely used for distinctive description, but should not be construed as indicating or suggesting relative importance.

Moreover, terms such as "horizontal", "vertical", and "pendulous", if appear, do not mean that a component is required to be absolutely horizontal or pendulous, but mean that the component can be slightly inclined. For example, by "horizontal" it merely means that a structure is more horizontal in direction in comparison with "vertical", but does not mean that this structure has to be completely horizontal, while the structure can be slightly inclined.

In the description of the present disclosure, it also should be indicated that unless expressly otherwise specified and defined, terms such as "provide", "mount", "join", and "connect", if appear, should be understood in a broad sense, for example, connection can be fixed connection, detachable connection, or integrated connection; it can be mechanical connection or electrical connection; it can be direct joining or indirect joining through an intermediate medium, and it also can be inner communication between two elements. For a person ordinarily skilled in the art, specific meanings of the above-mentioned terms in the present disclosure can be understood according to specific circumstances.

It should be indicated that the features in the embodiments of the present disclosure may be combined with each other if there is no conflict.

For the environment sensing system of automatic driving, an automobile needs a set of road surface detection system based on the visual or non-visual recognition technique, and a camera, a lidar, a millimeter wave radar, an ultrasonic radar etc. are commonly used. With a small dynamic range, the camera is affected by strong light and the sun, and has high requirements to strong computing power. The lidar is expensive in price, provides no color information, and is not accurate enough when monitoring an object that is capable of creating reflection or transparent. The millimeter wave radar and the ultrasonic radar are sensitive to certain materials, thus cannot determine a size of an object recognized, and have a relatively low relative resolution. The present embodiment provides an infrared-based road surface monitoring system, which can solve the technical problems that existing road surface real-time monitoring manners are complex in structure, ineffective, and relatively high in cost.

Please referring to FIG. 1 to FIG. 4, an infrared-based road surface monitoring system provided in an embodiment of the present disclosure includes: an infrared spotlight assembly 10, a camera 11, and an image processor 12 connected with the camera 11, wherein the infrared spotlight assembly 10 is configured to emit alternate bright and dark infrared stripes, the camera 11 is configured to capture a mode of real-time infrared stripes on a road surface, the image processor 12 is configured to calculate the form of the stripes on the road surface captured by the camera 11, so as to obtain road surface or obstacle information and calculate a condition of the road surface, which are fed back to an automatic driving system 13 of an automobile in real time, finally achieving purpose of monitoring road surface and automatic driving.

Figure 4:
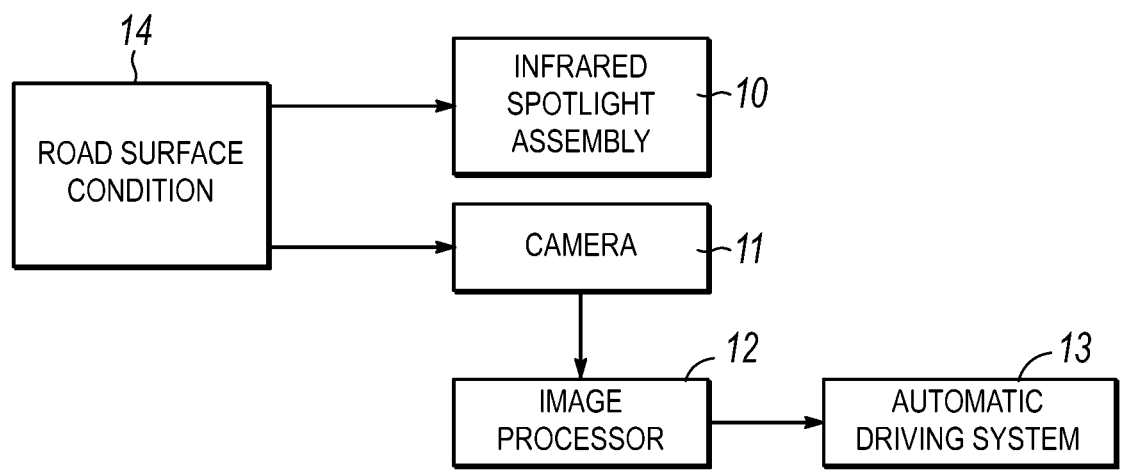
FIG. 4 is a flow structural schematic diagram of an infrared-based road surface monitoring method provided in an embodiment of the present disclosure.

As shown in FIG. 4, it can be seen from the analysis that in the infrared-based road surface monitoring system provided in the embodiment of the present disclosure, the infrared spotlight assembly 10 emits alternate bright and dark horizontal or vertical infrared stripes. When the stripes are irradiated onto a surface of an object, the irradiated object diffusely reflects infrared rays, and the infrared stripes are also regulated as a contour of the object changes, such that the shape of the stripes is distorted and deformed, and the mode of real-time infrared stripes on the road surface is captured with the camera 11. The image processor 12 calculates the form of the stripes on the road surface captured by the camera 11, then information on a road surface condition 14 (undulations and potholes on the road surface, and a distance to an obstacle, and position, shape, size, and height of the obstacle and so on) can be obtained, and the road surface condition 14 calculated by the image processor 12 is fed back to the automatic driving system 13 of a vehicle body in real time, thus finally achieving the purpose of monitoring road surface and automatic driving. To sum up, the infrared-based road surface monitoring system provided in the embodiment of the present disclosure can solve the problem of road surface monitoring in a vehicle traveling process with a simple structure at a relatively low cost, and meanwhile solve the technical problems that existing road surface real-time monitoring manners are complex in structure, ineffective, and relatively high in cost.

FIG. 1 is a structural schematic diagram of an infrared spotlight assembly in an infrared-based road surface monitoring system provided in an embodiment of the present disclosure.

In practical application, as shown in FIG. 1, the above infrared spotlight assembly 10 includes: a lens 1, a blocking structure 3, a reflecting mirror 4, and an infrared light source 6, wherein the infrared light source 6 and the blocking structure 3 are respectively mounted at two ends of the reflecting mirror 4, the lens 1 is mounted at one side of the blocking structure 3 and provided as being away from the infrared light source 6, and the blocking structure 3 is provided to be located at a focal plane of the lens 1; the infrared light source 6 is configured to emit infrared rays, which is reflected by the reflecting mirror 4, and the infrared rays pass through the blocking structure 3 to form a light pattern with alternate bright and dark stripes, and the infrared rays are transmitted through the lens 1 onto the front road surface to form a light pattern with zebra stripes.

Thus, when the stripes are irradiated onto the surface of the object, the object irradiated diffusely reflects the infrared rays, and the infrared stripes are also regulated as the contour of the object changes, such that the shape of the stripes is distorted and deformed, thereby obtaining information such as undulations and potholes on the road surface, and a distance to an obstacle, and position, shape, size, and height of the obstacle and so on.

Optionally, the infrared spotlight assembly 10 includes: the lens 1, the blocking structure 3, and the infrared light source 6, wherein the lens 1 and the infrared light source 6 are respectively mounted at two sides of the blocking structure 3, and the blocking structure 3 is provided to be located at the focal plane of the lens 1; the infrared light source 6 is configured to emit infrared rays, and the infrared rays pass through the blocking structure 3 to form the light pattern with alternate bright and dark stripes, and the infrared rays are transmitted through the lens 1 onto the front road surface to form the light pattern with zebra stripes.

It can be understood that different from the structure in FIG. 1, in a mode, the reflecting mirror 4 may be not mounted, and the infrared rays still can be transmitted, in a manner of direct emission of the infrared light source 6, onto the front road surface to form the light pattern with zebra stripes.

In the above, as shown in FIG. 1, the above infrared spotlight assembly further may include a lens holder 2, and the lens 1 may be mounted on the lens holder 2.

Specifically, as shown in FIG. 1, the above infrared spotlight assembly further may include a heat sink 5, and the heat sink 5 may be mounted on a back face of the infrared light source 6.

Optionally, the above blocking structure 3 may be a grating. An optical device consisting of a large number of parallel slits with equal width and equal spacing is called as grating. Generally, a commonly used grating is made by engraving lots of parallel indentations on a glass sheet, wherein the indentations are opaque portions, and a smooth portion between each two indentations can transmit light, and thus is equivalent to a slit (the slit may be construed as a strip-shaped light-transmission hole 33 below). A refined grating is engraved with thousands or even tens of thousands of indentations within a width of 1 cm. Such grating performing diffraction by means of transmitted light is called as transmission grating. There is still a grating performing diffraction by means of reflected light between two indentations, for example, many parallel indentations are engraved on a surface plated with a metal layer, and a smooth metallic face between two indentations can reflect light, then such grating is called as reflection grating.

Figure 2:
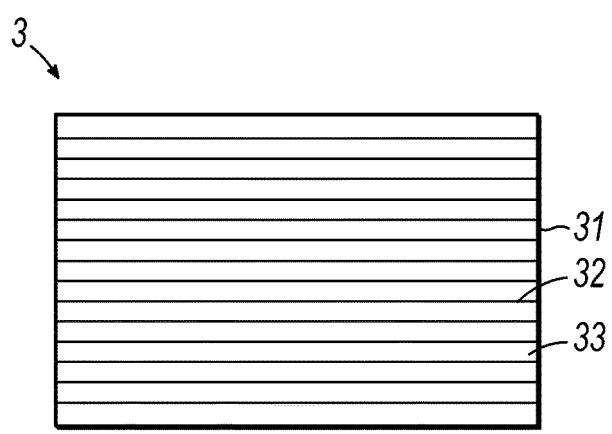
FIG. 2 is a structural schematic diagram of a blocking structure in the infrared spotlight assembly of the infrared-based road surface monitoring system provided in an embodiment of the present disclosure.
Figure 3:
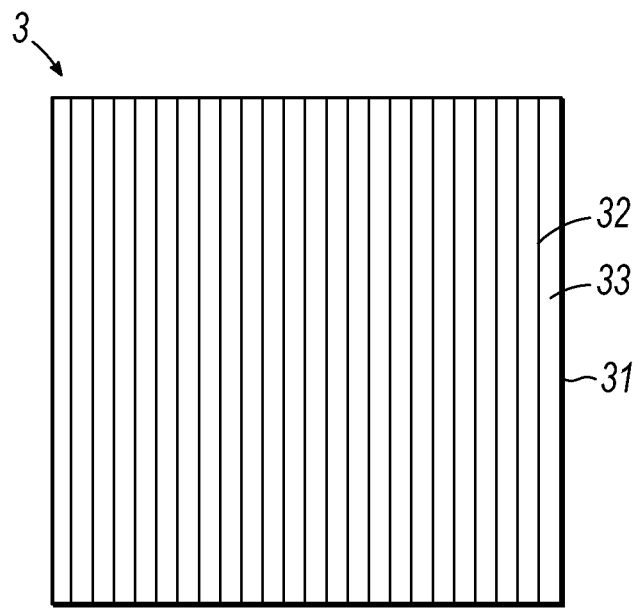
FIG. 3 is a structural schematic diagram of another blocking structure in the infrared spotlight assembly of the infrared-based road surface monitoring system provided in an embodiment of the present disclosure.

Optionally, combining FIG. 2 and FIG. 3, the blocking structure 3 has several parallel strip-shaped light-transmission holes 33 thereon and is located at a projection exit of the infrared rays. The blocking structure 3 includes a frame 31 and several blocking sheets 32 provided on the frame 31, wherein the several blocking sheets 32 are provided in parallel so as to constitute the strip-shaped light-transmission holes 33 through gaps between adjacent blocking sheets 32.

It can be understood that the strip-shaped light-transmission holes 33 can be formed by opening multiple parallel strip-shaped holes on one plate, and also can be formed by gaps between multiple blocking objects provided in parallel.

Optionally, the above blocking structure 3 may be a light guiding plate transmitting light at intervals using refraction of the lens 1.

FIG. 2 is a structural schematic diagram of a blocking structure in the infrared spotlight assembly of the infrared-based road surface monitoring system provided in an embodiment of the present disclosure; FIG. 3 is a structural schematic diagram of another blocking structure in the infrared spotlight assembly of the infrared-based road surface monitoring system provided in an embodiment of the present disclosure.

Optionally, the above blocking structure 3 may be a horizontal-stripe blocking structure, as shown in FIG. 2; the above blocking structure 3 also may be a vertical-stripe blocking structure, as shown in FIG. 3.

In practical application, two infrared spotlight assemblies 10 above-mentioned may be included, and they are configured to be respectively arranged on vehicle lamps at two sides of the automobile.

In the above, infrared rays from the vehicle lamp at one side are converted by the blocking structure 3 into horizontal stripes, infrared rays from the vehicle lamp at the other side are converted by the blocking structure 3 into vertical stripes, and a picture is taken by the camera 11; alternatively, the infrared rays from the vehicle lamps at the two sides are configured to start to simultaneously present the horizontal stripes and the vertical stripes, and a picture is taken by the camera 11; alternatively, the infrared rays from the vehicle lamps at the two sides are configured to start to present the horizontal stripes and the vertical stripes intermittently at a certain frequency, and a picture is taken by the camera 11.

In practical application, the above infrared spotlight assembly 10 can be configured to be arranged on the vehicle lamp at one side of the automobile, and infrared rays are converted by the blocking structure 3 into horizontal stripes or vertical stripes; the camera 11 can be arranged on the other side of the automobile, and configured to capture the light pattern with the horizontal stripes or the vertical stripes irradiated onto the road surface.

In an embodiment:

The infrared light source 6 (an LED light source) in the infrared spotlight assembly 10 emits infrared light waves, the infrared rays are reflected by the reflecting mirror 4 to the blocking structure 3, and the infrared spotlight assemblies 10 at the two sides of the automobile are respectively provided with the blocking structure 3 with horizontal stripes and the blocking structure 3 with vertical stripes. The infrared rays from the vehicle lamp at one side, after passing through the blocking structure 3 with horizontal stripes and the lens 1, are converted into alternate bright and dark horizontal infrared stripes, and the infrared rays from the vehicle lamp at the other side, after passing through the blocking structure 3 with vertical stripes and the lens 1, are converted into alternate bright and dark vertical infrared stripes. A light pattern with horizontal zebra stripes and a light pattern with vertical zebra stripes are respectively formed when the alternate bright and dark horizontal infrared stripes and the alternate bright and dark vertical infrared stripes are projected onto the road surface. Specifically, the vehicle lamps at the two sides can simultaneously start to present the horizontal stripes and the vertical stripes, and a picture is taken by the camera 11.

When the horizontal and vertical stripes are irradiated onto the surface of the object, continuous zebra stripes will be distorted and deformed with the contour of the object, the modes of real-time horizontal and vertical infrared stripes on the road surface are collected with the camera 11, and after the forms of the stripes are processed by the image processor 12, more accurate information such as undulations and potholes on the road surface and so on, and the distance to the obstacle, position, size, and height of the obstacle and so on can be obtained. A picture of the road surface formed by the horizontal stripes is advantageous to calculate conditions in the front and rear of the road surface, and a picture of the road surface formed by the vertical stripes is advantageous to calculate conditions in the left and right of the road surface; coexistence of the horizontal infrared stripes and the vertical infrared stripes can improve resolution of the road surface monitoring. Finally, the road surface condition 14 calculated by the image processor 12 is fed back to the automatic driving system 13 of the automobile in real time, so as to achieve the purpose of monitoring road surface and automatic driving.

In another embodiment:

The infrared light source 6 (an LED light source) in the infrared spotlight assembly 10 emits infrared light waves, the infrared rays are reflected by the reflecting mirror 4 to the blocking structure 3, and the infrared spotlight assemblies at the two sides of the automobile are respectively provided with the blocking structure 3 with horizontal stripes and the blocking structure 3 with vertical stripes. The infrared rays from the vehicle lamp at one side, after passing through the blocking structure 3 with horizontal stripes and the lens 1, are converted into alternate bright and dark horizontal infrared stripes, the infrared rays from the vehicle lamp at the other side, after passing through the blocking structure 3 with vertical stripes and the lens 1, are converted into alternate bright and dark vertical infrared stripes. A light pattern with horizontal zebra stripes and a light pattern with vertical zebra stripes are respectively formed when the alternate bright and dark horizontal infrared stripes and the alternate bright and dark vertical infrared stripes are projected onto the road surface. The horizontal and vertical stripes are intermittently started to present at a certain frequency for the infrared spotlights at two sides; moreover, in different road surface conditions, the infrared spotlight assembly 10 emitting the horizontal stripes or the vertical stripes can be activated independently, thus quantity of electricity can be saved, and the picture is taken by the camera 11.

When the horizontal stripes and the vertical stripes are started to present intermittently at a certain frequency to be irradiated onto the surface of the object, the zebra stripes are distorted and deformed with the contour of the object, the modes of real-time horizontal and vertical infrared stripes on the road surface are collected with the camera 11, and after the forms of the stripes are processed by the image processor 12, more accurate information such as undulations and potholes on the road surface and so on, and the distance to the obstacle, position, size, and height of the obstacle and so on can be obtained. A picture of the road surface formed by the horizontal stripes is advantageous to calculate conditions in the front and rear of the road surface, and a picture of the road surface formed by the vertical stripes is advantageous to calculate conditions in the left and right of the road surface; coexistence of the horizontal infrared stripes and the vertical infrared stripes can improve resolution of the road surface monitoring. Finally, the road surface condition 14 calculated by the image processor 12 is fed back to the automatic driving system 13 of the automobile in real time, so as to achieve the purpose of monitoring road surface and automatic driving FIG. 4 is a flow structural schematic diagram of an infrared-based road surface monitoring method provided in an embodiment of the present disclosure.

As shown in FIG. 4, an embodiment of the present disclosure further provides an infrared-based road surface monitoring method, including following steps: emitting, by an infrared spotlight assembly 10, alternate bright and dark infrared stripes; capturing, by a camera 11, a mode of real-time infrared stripes on a road surface; and calculating, by an image processor 12, the mode of stripes on the road surface captured by the camera 11, so as to obtain road surface or obstacle information and calculate a condition of the road surface, which are fed back to an automatic driving system 13 of an automobile in real time.

It can be seen from the analysis that in the infrared-based road surface monitoring method provided in the embodiment of the present disclosure, the infrared spotlight assembly 10 emits alternate bright and dark horizontal or vertical infrared stripes. When the stripes are irradiated onto a surface of an object, the irradiated object diffusely reflects infrared rays, and the infrared stripes are also regulated as a contour of the object changes, such that the shape of the stripes is distorted and deformed, and the mode of real-time infrared stripes on the road surface is captured with the camera 11. The image processor 12 calculates the form of the stripes on the road surface captured by the camera 11, then information on a road surface condition 14 (undulations and potholes on the road surface, and a distance to an obstacle, and position, shape, size, and height of the obstacle and so on) can be obtained, and the road surface condition 14 calculated by the image processor 12 is fed back to the automatic driving system 13 of a vehicle body in real time, thus finally achieving the purpose of monitoring road surface and automatic driving.

To sum up, the infrared-based road surface monitoring method provided in the embodiment of the present disclosure can solve the problem of road surface monitoring in a vehicle traveling process at a relatively low cost, and meanwhile solve the technical problems that existing road surface real-time monitoring manners are ineffective and relatively high in cost.

An embodiment of the present disclosure further provides an automobile, including the above infrared-based road surface monitoring system, or using the above infrared-based road surface monitoring method.

Distinguished from current mainstream sensors and radar monitoring manner, the infrared-based road surface monitoring system and method, and the automobile provided in the embodiments of the present disclosure can achieve road surface monitoring in an extremely simple and low-cost manner. The infrared spotlight assembly 10, the camera 11, and the image processor 12 are combined in the vehicle lamp, thus effectively achieving obstacle detection in a vehicle traveling process.

In Some Embodiments

Please referring to FIG. 1: the infrared spotlight assembly 10 shown in FIG. 1 includes the lens 1, the lens holder 2, the blocking structure 3, the reflecting mirror 4, the heat sink 5, and the infrared light source 6, wherein the infrared light source 6 is configured to emit infrared rays; the blocking structure 3 is located at the projection exit of the infrared rays; the reflecting mirror 4, assembled corresponding to the infrared light source 6, is configured to reflect the infrared rays emitted by the infrared light source 6 to the blocking structure 3 so as to form the infrared stripes; the lens 1 is mounted at the projection exit of the infrared rays through the lens holder 2, such that the infrared stripes pass through the lens 1 and are projected onto the traveling road surface; and the infrared light source 6 is provided on the heat sink 5.

Pleasing referring to FIG. 2 and FIG. 3: FIG. 2 and FIG. 3 respectively show the horizontal blocking structure 3 and the vertical blocking structure 3, wherein each blocking structure 3 includes the frame 31 and multiple blocking sheets 32, the multiple blocking sheets 32 are provided in parallel, the strip-shaped light-transmission hole 33 is formed between each two adjacent blocking sheets 32, and the reflecting mirror 4 reflects the infrared rays emitted by the infrared light source 6 to the blocking structure 3 so as to form the infrared stripes through the strip-shaped light-transmission holes 33.

Please referring to FIG. 4, the infrared-based road surface monitoring system shown in FIG. 4 includes the infrared spotlight assembly 10, the camera 11, and the image processor 12 connected with the camera 11, wherein the infrared spotlight assembly 10 is configured to emit alternate bright and dark infrared stripes, the camera 11 is configured to capture the mode of real-time infrared stripes on the road surface, the image processor 12 is configured to calculate the mode of stripes on the road surface captured by the camera 11 so as to obtained the road surface or obstacle information and calculate the road surface condition 14, which are fed back to the automatic driving system 13 of the automobile in real time, finally achieving the purpose of monitoring road surface and automatic driving.

The above-mentioned are merely for specific embodiments of the present disclosure, but the scope of protection of the present disclosure is not limited thereto, and changes and substitutions that may be easily envisaged by any person skilled familiar with the technical field within the technical scope disclosed in the present disclosure should fall within the scope of protection of the present disclosure. Therefore, the scope of protection of the present disclosure should be based on the scope of protection of the claims.

INDUSTRIAL APPLICABILITY

To sum up, the present disclosure provides the infrared-based road surface monitoring system and method, and the automobile, which can achieve real-time monitoring of road surface. The system has a simple structure, relatively good effect, and relatively low cost.

What is claimed is:
1. An infrared-based road surface monitoring system, comprising: an infrared spotlight assembly, a camera, and an image processor connected with the camera, wherein
the infrared spotlight assembly is configured to emit alternate bright and dark infrared stripes, the camera is configured to capture a mode of real-time infrared stripes on a road surface, the image processor is configured to calculate a mode of stripes on the road surface captured by the camera, so as to obtain road surface or obstacle information and calculate a condition of the road surface, which are fed back to an automatic driving system of an automobile in real time, finally achieving purpose of monitoring the road surface and automatic driving,
wherein the infrared spotlight assembly comprises: a lens, a blocking structure, a reflecting mirror, and an infrared light source;
the infrared light source and the blocking structure are respectively mounted at two ends of the reflecting mirror, and the lens is mounted at one side of the blocking structure and provided as being away from the infrared light source; and
the infrared light source is configured to emit infrared rays, which is reflected by the reflecting mirror, and the infrared rays pass through the blocking structure to form a light pattern with alternate bright and dark stripes, and the infrared rays are transmitted through the lens onto a front road surface to form a light pattern with zebra stripes,
wherein the infrared-based road surface monitoring system comprises two infrared spotlight assemblies, which are configured to be respectively arranged on vehicle lamps at two sides of the automobile,
wherein infrared rays from a vehicle lamp at one side are converted by the blocking structure into horizontal stripes, infrared rays from a vehicle lamp at the other side are converted by the blocking structure into vertical stripes, and a picture is taken by the camera;
alternatively, infrared rays from the vehicle lamps at two sides are configured to start to simultaneously present the horizontal stripes and the vertical stripes, and a picture is taken by the camera;
alternatively, the infrared rays from the vehicle lamps at two sides are configured to start to present the horizontal stripes and the vertical stripes intermittently at a certain frequency, and a picture is taken by the camera.

2. The infrared-based road surface monitoring system according to claim 1, wherein the infrared spotlight assembly comprises: a lens, a blocking structure, and an infrared light source;
the lens and the infrared light source are respectively mounted at two sides of the blocking structure; and
the infrared light source is configured to emit infrared rays, and the infrared rays pass through the blocking structure to form a light pattern with alternate bright and dark stripes, and the infrared rays are transmitted through the lens onto a front road surface to form a light pattern with zebra stripes.

3. The infrared-based road surface monitoring system according to claim 1, wherein the blocking structure is provided to be located at a focal plane of the lens.

4. The infrared-based road surface monitoring system according to claim 1, wherein the infrared spotlight assembly further comprises a lens holder, and the lens is mounted on the lens holder.

5. The infrared-based road surface monitoring system according to claim 1, wherein the infrared spotlight assembly further comprises a heat sink, and the heat sink is mounted on a back face of the infrared light source.

6. The infrared-based road surface monitoring system according to claim 1, wherein the blocking structure is a grating.

7. The infrared-based road surface monitoring system according to claim 1, wherein the blocking structure has several parallel strip-shaped light-transmission holes thereon and is located at a projection exit of the infrared rays.

8. The infrared-based road surface monitoring system according to claim 7, wherein the blocking structure comprises a frame and several blocking sheets provided on the frame, the several blocking sheets are provided in parallel so as to constitute the strip-shaped light-transmission holes through gaps between adjacent blocking sheets.

9. The infrared-based road surface monitoring system according to claim 1, wherein the blocking structure is a light guiding plate transmitting light at intervals using refraction of the lens.

10. An infrared-based road surface monitoring method applicable to the infrared-based road surface monitoring system according to claim 1, comprising following steps:
   emitting, by an infrared spotlight assembly, alternate bright and dark infrared stripes;
   capturing, by a camera, a mode of real-time infrared stripes on a road surface; and
   calculating, by an image processor, a mode of stripes on the road surface captured by the camera, so as to obtain road surface or obstacle information and calculate a condition of the road surface, which are fed back to an automatic driving system of an automobile in real time.

11. An automobile, comprising the infrared-based road surface monitoring system according to claim 1;
   or the automobile using the infrared-based road surface monitoring method according to claim 10.

12. The automobile according to claim 11, wherein the infrared spotlight assembly comprises: a lens, a blocking structure, a reflecting mirror, and an infrared light source;
   the infrared light source and the blocking structure are respectively mounted at two ends of the reflecting mirror, and the lens is mounted at one side of the blocking structure and provided as being away from the infrared light source; and
   the infrared light source is configured to emit infrared rays, which is reflected by the reflecting mirror, and the infrared rays pass through the blocking structure to form a light pattern with alternate bright and dark stripes, and the infrared rays are transmitted through the lens onto a front road surface to form a light pattern with zebra stripes.

13. The automobile according to claim 11, wherein the infrared spotlight assembly comprises: a lens, a blocking structure, and an infrared light source;
   the lens and the infrared light source are respectively mounted at two sides of the blocking structure; and
   the infrared light source is configured to emit infrared rays, and the infrared rays pass through the blocking structure to form a light pattern with alternate bright and dark stripes, and the infrared rays are transmitted through the lens onto a front road surface to form a light pattern with zebra stripes.

14. The automobile according to claim 12, wherein the blocking structure is provided to be located at a focal plane of the lens.

15. The automobile according to claim 12, wherein the infrared spotlight assembly further comprises a lens holder, and the lens is mounted on the lens holder.

16. The automobile according to claim 12, wherein the infrared spotlight assembly further comprises a heat sink, and the heat sink is mounted on a back face of the infrared light source.

* * * * *